(12) United States Patent
Inoue et al.

(10) Patent No.: US 10,730,417 B2
(45) Date of Patent: Aug. 4, 2020

(54) SEAT BACK BOARD, TRIM COVER AND VEHICLE SEAT

(71) Applicants: TACHI-S CO., LTD., Tokyo (JP); KASAI KOGYO CO., LTD., Kanagawa (JP)

(72) Inventors: Takashi Inoue, Tokyo (JP); Akinori Taniguchi, Tokyo (JP); Takayuki Ohmori, Tokyo (JP); Keita Myochin, Tokyo (JP); Saori Aoyama, Kanagawa (JP)

(73) Assignees: TACHI-S CO., LTD., Tokyo (JP); KASAI KOGYO CO., LTD., Kanagawa (JP)

( * ) Notice: Subject to any disclaimer, the term of this patent is extended or adjusted under 35 U.S.C. 154(b) by 0 days.

(21) Appl. No.: 16/216,268

(22) Filed: Dec. 11, 2018

(65) Prior Publication Data
US 2019/0176665 A1 Jun. 13, 2019

(30) Foreign Application Priority Data
Dec. 13, 2017 (JP) .................................. 2017-238787

(51) Int. Cl.
*B60N 2/58* (2006.01)
*B60N 2/68* (2006.01)
*B60N 2/60* (2006.01)

(52) U.S. Cl.
CPC ........... *B60N 2/5825* (2013.01); *B60N 2/609* (2013.01); *B60N 2/682* (2013.01)

(58) Field of Classification Search
CPC ...... B60N 2/5825; B60N 2/58; B60N 2/5816; B60N 2/609; B60N 2/6018; B60N 2/682

USPC .................................................... 297/452.18
See application file for complete search history.

(56) References Cited

U.S. PATENT DOCUMENTS

| 5,503,454 A * | 4/1996 | Sakamoto | B60N 2/5825 297/218.1 |
|---|---|---|---|
| 10,279,714 B2 * | 5/2019 | Line | B60N 2/2222 |
| 2014/0042785 A1 * | 2/2014 | Sato | B60N 2/4228 297/216.14 |
| 2014/0084661 A1 * | 3/2014 | Awata | B60N 2/5825 297/452.18 |
| 2015/0097406 A1 * | 4/2015 | Tanaka | B60N 2/5816 297/378.1 |

(Continued)

FOREIGN PATENT DOCUMENTS

| JP | 2009-291599 A | 12/2009 |
|---|---|---|
| JP | 2013-047076 A | 3/2013 |
| WO | WO 2013/030666 A2 | 3/2013 |

*Primary Examiner* — Mark R Wendell
(74) *Attorney, Agent, or Firm* — Paratus Law Group, PLLC

(57) ABSTRACT

A seat back board includes: a flexible plate member which is made of a resin material and has the Shore hardness higher than 50, the plate member including: a back-surface covering part which covers a back surface of a seat back; and a bottom-surface covering part which covers a bottom surface of a seat cushion; a sewing part, which is sewn with a cover member covering a front surface and side surfaces of the seat back or is sewn with a coupling member to be coupled with the cover member in a detachable manner, being provided in an edge portion of the back-surface covering part; and a locking part, to be locked in the seat cushion, being provided in the bottom-surface covering part.

8 Claims, 5 Drawing Sheets

(56) References Cited

U.S. PATENT DOCUMENTS

2017/0305316 A1* 10/2017 Lafferty .............. B60N 2/5825
2018/0037148 A1*  2/2018 Line ................... B60N 2/809
2018/0194254 A1*  7/2018 Fujikake ............. B60N 2/6027

* cited by examiner

SEAT BACK BOARD, TRIM COVER AND VEHICLE SEAT

CROSS-REFERENCE TO RELATED APPLICATION(S)

This application is based upon and claims the benefit of priority from Japanese Patent Application No. 2017-238787, filed on Dec. 13, 2017, the entire contents of which are incorporated herein by reference.

BACKGROUND

1. Field of the Invention

The present invention relates to a seat back board, a trim cover and a vehicle seat.

2. Description of the Related Art

A seat in which a back surface of a seat back of a front seat is formed in a recess shape to enlarge a leg space of a rear-seat occupant is known as a seat to be mounted in a vehicle such as an automobile. Such a kind of seat includes a relatively rigid seat back board made of a resin material. Typically, the seat back board is fixed to a wire, a bracket, or the like which is attached in a seat back frame through a hook, a clip, or the like.

In a seat back board described in JP-A-2013-47076, a carpet is joined with the lower portion of the seat back board, and the lower end portion of a seat back and the bottom surface of a seat cushion are covered with the carpet to improve the appearance of the seat.

In a seat back for automobile described in JP-A-2009-291599, the back surface of the seat back is covered with molded nonwoven fabric. The molded nonwoven fabric is impregnated with a synthetic resin to be molded in a concavo-convex shape and is soft to be sewable. The molded nonwoven fabric is sewn with a front surface skin which covers the front surface of the seat back or is sewn with a slide fastener which is coupled with the front surface skin in a detachable manner.

Further, a bent portion which covers the lower end portion of the seat back and the bottom surface of the seat cushion is provided to be integrated with the lower portion of the molded nonwoven fabric.

Typically, the relatively rigid seat back board is fixed to the wire, the bracket, or the like which is attached in the seat back frame. However, the wire, the bracket, or the like is needed for the seat back frame, so that the number of components of the seat may be increased.

As the seat back board described in JP-A-2013-47076, in order to cover the lower end portion of the seat back and the bottom surface of the seat cushion, the carpet which is joined with the lower portion of the seat back board is needed additionally. Thus, the number of components may be increased, the number of manhours may be increased due to the joining of the seat back board and the carpet, and the appearance may deteriorate due to the joining of the seat back board and the carpet.

Also, in the seat back for automobile described in JP-A-2009-291599, for example, the relatively soft molded nonwoven fabric which covers the back surface of the seat back is sewn with the front surface skin covering the front surface of the seat back to be fixed in the seat back. In addition, the molded nonwoven fabric integrally includes the bent portion which covers the lower end portion of the seat back and the bottom surface of the seat cushion.

Incidentally, as for the shape of the back surface of the seat back, a requirement such as a curvature radius of a surface and a height of a protrusion is regulated by the law such as Safety Standards for Road Transport Vehicles (Appendix 30: technical standards of seat and seat installation device) and European Commission Regulations (UN-R17-08). Under such a law, a relatively soft material such as molded nonwoven fabric, specifically, a material having the Shore hardness of 50 or lower is not admitted as a component which forms the back surface of the seat back, and the back surface of the seat back is required to satisfy the requirement in a state where the molded nonwoven fabric is removed. In this case, a rounding process of an edge of the seat back frame, a squeezing process of the protrusion, and the like are needed so that the number of manhours may be increased, or a cover which covers and hides the edge, the protrusion, or the like is needed so that the number of components may be increased.

SUMMARY

The invention has been made in consideration of the above situation, and an object thereof is to provide a seat back board, a trim cover, and a vehicle seat with which the number of components and the number of manhours can be reduced, thereby improving the appearance thereof.

According to an aspect of the invention, there is provided a seat back board including: a flexible plate member which is made of a resin material and has the Shore hardness higher than 50, the plate member including: a back-surface covering part which covers a back surface of a seat back; and a bottom-surface covering part which covers a bottom surface of a seat cushion; a sewing part, which is sewn with a cover member covering a front surface and side surfaces of the seat back or is sewn with a coupling member to be coupled with the cover member in a detachable manner, being provided in an edge portion of the back-surface covering part; and a locking part, to be locked in the seat cushion, being provided in the bottom-surface covering part.

According to another aspect of the invention, there is provided a trim cover including: the seat back board; and a cover member which covers a front surface and side surfaces of a seat back, wherein the sewing part provided in the back-surface covering part of the seat back board and the cover member are sewn directly or are coupled through the coupling member sewn with the sewing part.

According to still another aspect of the invention, there is provided a seat back which is covered with the trim cover.

According to the invention, it is possible to provide the seat back board, the trim cover, and the vehicle seat with which the number of components and the number of manhours can be reduced, thereby improving the appearance thereof.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
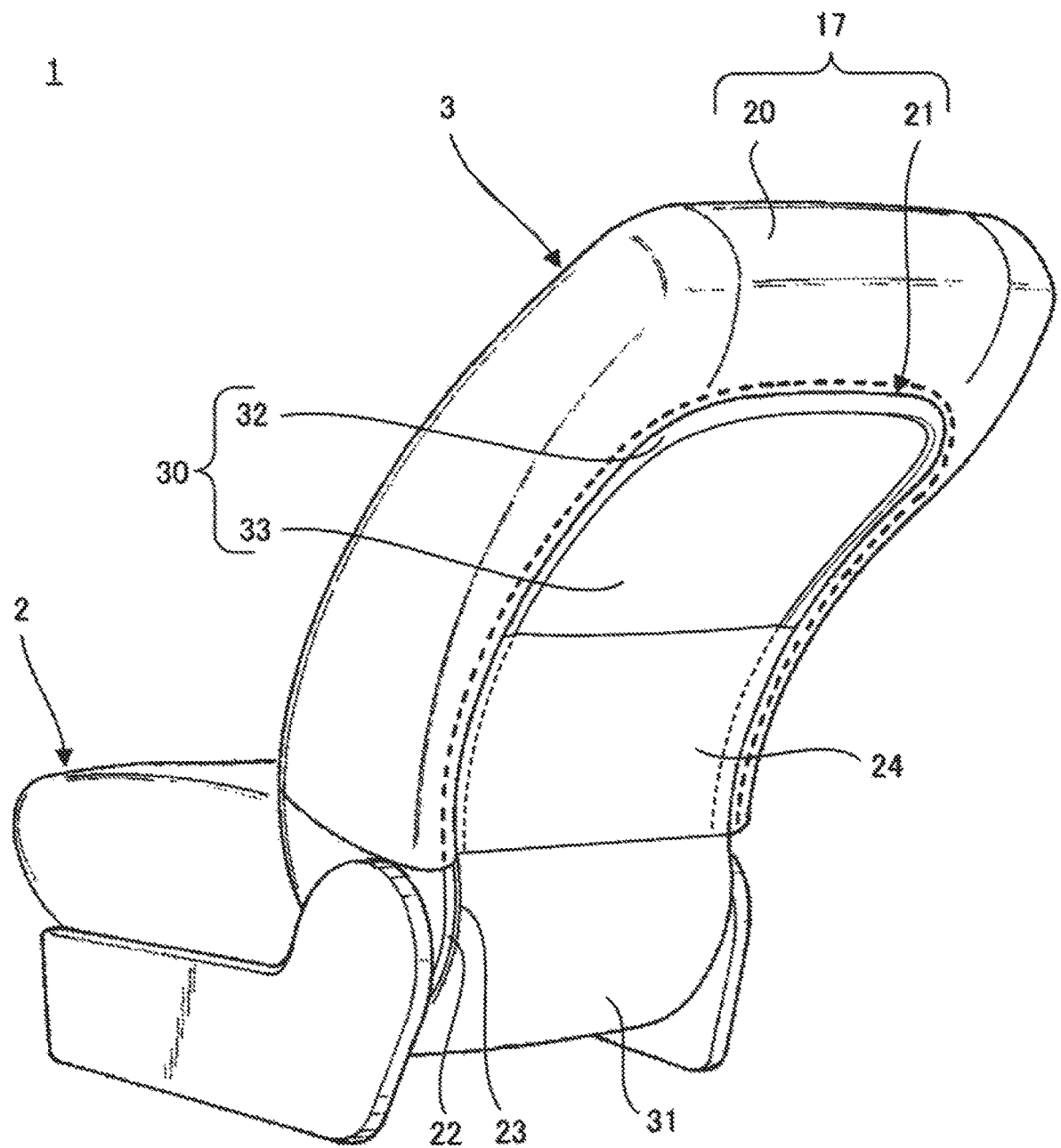
FIG. 1 is a perspective view illustrating one example of a vehicle seat for describing an embodiment of the invention.
Figure 2:
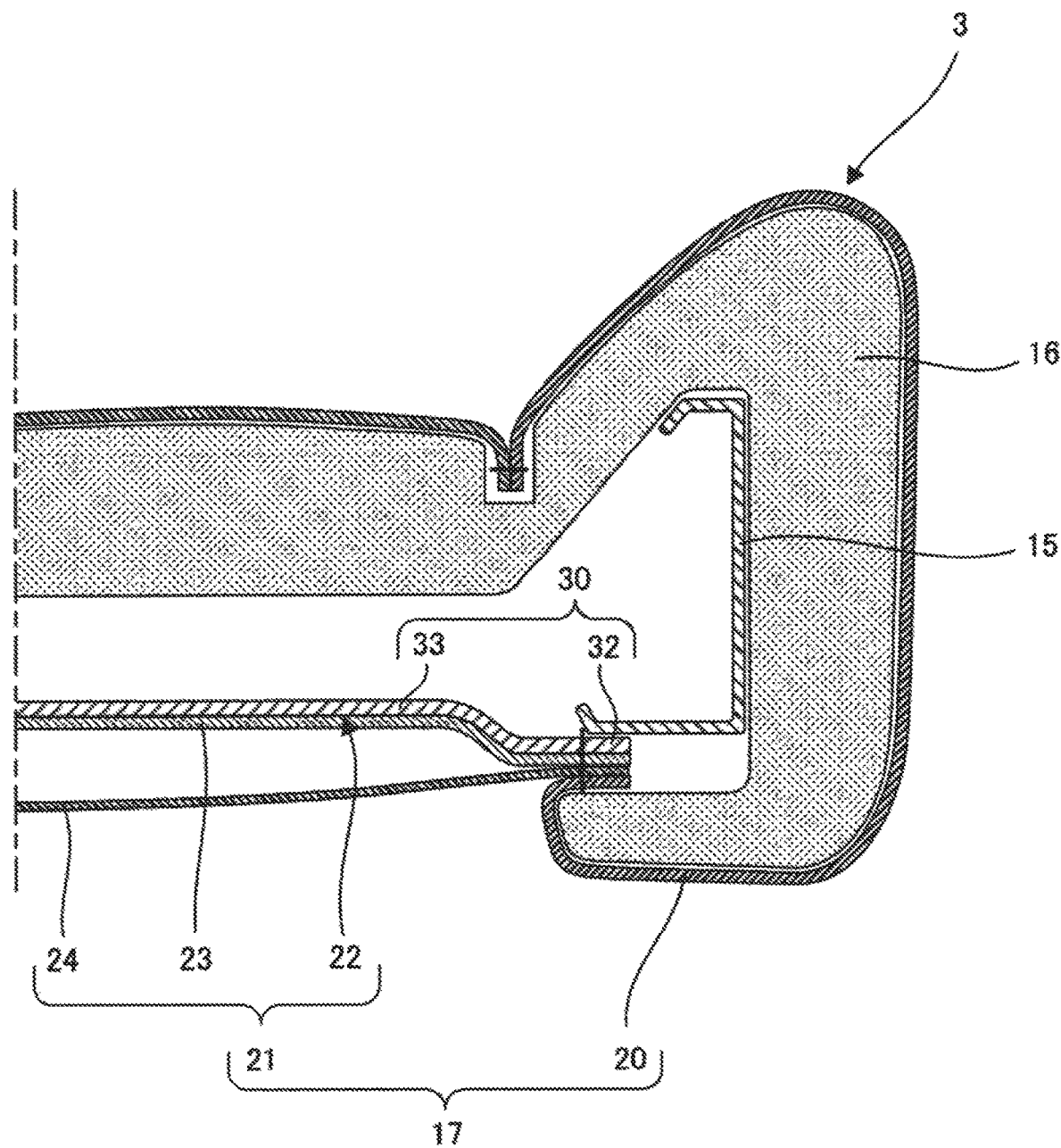
FIG. 2 is a longitudinal sectional view illustrating the vehicle seat illustrated in FIG. 1.
Figure 3:
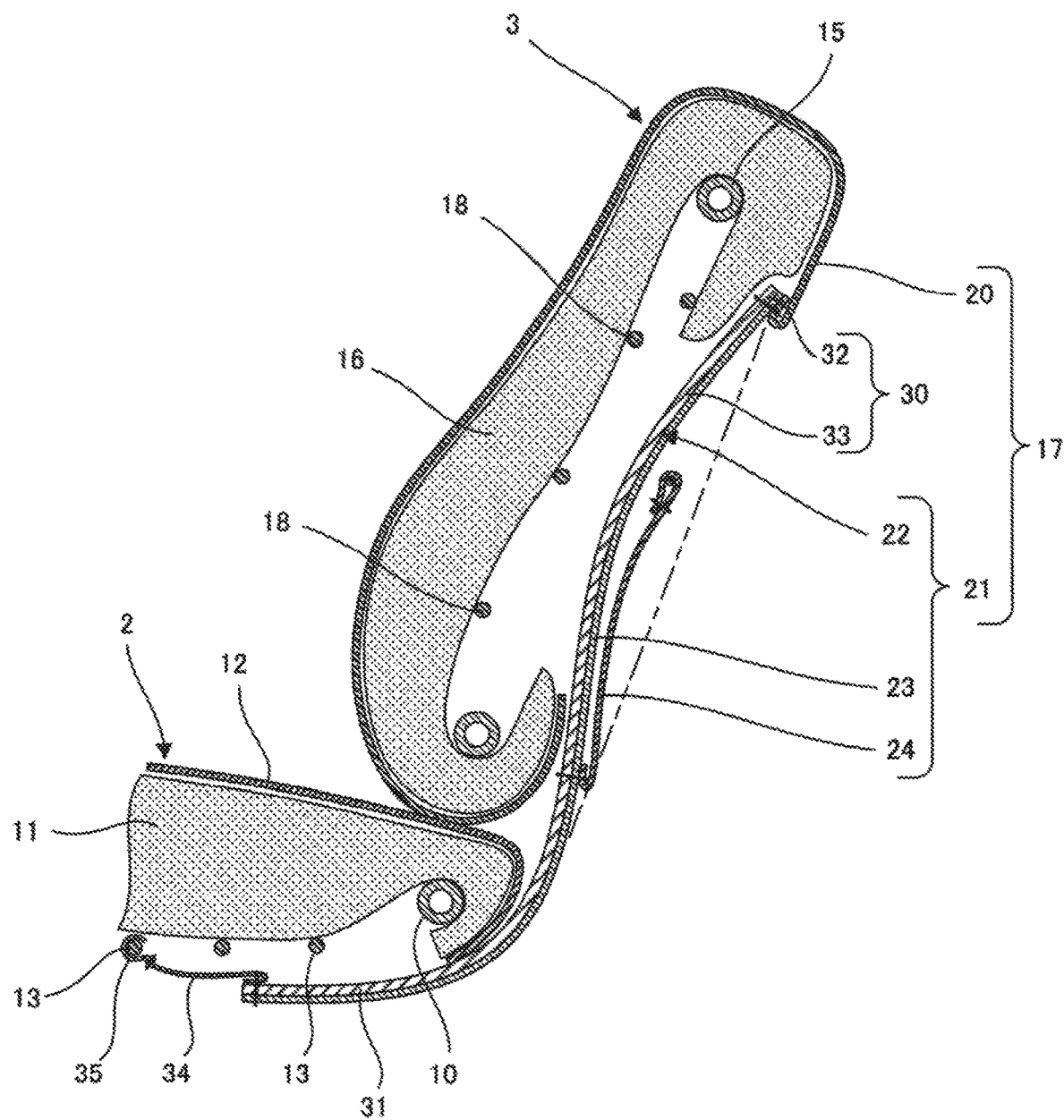
FIG. 3 is a horizontal sectional view illustrating a seat back of the vehicle seat illustrated in FIG. 1.

FIGS. 1 to 3 are perspective views illustrating one example of a vehicle seat for describing an embodiment of the invention.

A vehicle seat 1 illustrated in FIGS. 1 to 3 is a seat which is provided in a vehicle such as an automobile, and includes a seat cushion 2 which supports a hip and a thigh of an occupant (hereinafter, referred to as a sitting person) sitting on the seat 1 and a seat back 3 which supports a waist and a back of the sitting person.

The seat cushion 2 includes a frame-like seat cushion frame 10 which forms a frame of the seat cushion 2. Further, the seat cushion frame 10 is covered with a cushion pad 11 which is made of a relatively soft foamed resin material such as urethane foam and is further covered with a trim cover 12 which is obtained by sewing a plurality of skin materials. For example, the skin material is leather, woven fabric, and nonwoven fabric. A plurality of seat springs 13 are laid in the seat cushion frame 10, and the cushion pad 11 is supported by the plurality of seat springs 13.

The seat back 3 includes a frame-like seat back frame 15 which forms the frame of the seat back 3. The seat back frame 15 is covered with a back pad 16 and is further covered with a trim cover 17. A plurality of seat springs 18 are laid in the seat back frame 15, and the back pad 16 is supported by the plurality of seat springs 18.

The trim cover 17 of the seat back 3 includes a cover member 20 and a seat back board 21. The cover member 20 is sewn with a plurality of skin materials and covers the front surface of the seat back 3 which contacts the waist and the back of the sitting person and both side surfaces in a seat width direction. The back surface of the seat back 3 is covered with the seat back board 21. The seat back board 21 includes a flexible plate member 22 which is made of a resin material such as polypropylene, for example.

The plate member 22 has the Shore hardness higher than 50 and is sewable. The Shore hardness that enables sewing depends on a sewing speed but preferably is 100 or lower. If the Shore hardness is 100 or lower, for example, the plate member 22 can be sewn with the skin material which forms the cover member 20 at the same sewing speed, and an operational efficiency can be maintained. Preferably, the thickness of the resin material forming the plate member 22 is in a range of 0.7 mm to 2.0 mm. Accordingly, the Shore hardness of the plate member 22 can be higher than 50 and equal to or lower than 100.

The plate member 22 includes a back-surface covering part 30 which covers the back surface of the seat back 3 and a bottom-surface covering part 31 which covers the bottom surface of the seat cushion 2. A sewing part 32 is provided which extends in a substantially U shape in the upper edge portion of the back-surface covering part 30 and both side edge portions in the seat width direction, and a recessed part 33 is provided inside the sewing part 32. For example, the recessed part 33 is formed such that the flat plate of the plate member 22 as a raw material is subjected to thermoforming.

The sewing part 32 is sewn with the cover member 20. Since the sewing part 32 is sewn with the cover member 20, the trim cover 17 formed of the cover member 20 and the seat back board 21 is formed in a bag shape. The trim cover 17 formed in the bag shape covers a range from the upper end portion side of the seat back 3 to the back pad 16. Accordingly, the seat back board 21 is fixed in the seat back 3, and the back surface of the seat back 3 is covered with the back-surface covering part 30 of the plate member 22. When the back-surface covering part 30 covers the back surface of the seat back 3, the recessed part 33 is recessed toward the front surface side of the seat back 3, and a leg space of the rear-seat occupant is enlarged by the recessed part 33.

The Shore hardness of the plate member 22 of the seat back board 21 is higher than 50. Thus, under the law (Safety Standards for Road Transport Vehicles, European Commission Regulations, and the like), the back-surface covering part 30 is considered as a component which forms the back surface of the seat back 3. Accordingly, a rounding process of an edge of the seat back frame 15 which is covered and hid by the back-surface covering part 30, a squeezing process of a protrusion, and the like are not needed, thereby reducing the number of manhours. Incidentally, the back-surface covering part 30 is a molded body of a resin material, and the surface shape of the back-surface covering part 30 is easily molded to satisfy the requirement regulated by the law. Further, the seat back board 21 is sewn with the cover member 20 to be fixed in the seat back 3. Thus, it is not necessary to provide a wire, a bracket, and the like for fixing the seat back board 21 in the seat back frame 15, and the number of components of the seat can be reduced, and the seat can be reduced in weight.

The bottom-surface covering part 31 is flexible to be pulled in the bottom surface of the seat cushion 2 over the lower end portion of the seat back 3. A bend piece 34 extending to the seat front side along the bottom surface of the seat cushion 2 is sewn with the bottom-surface covering part 31, and a substantially J-shaped hook 35 made of a resin material is sewn with the tip portion of the bend piece 34. The hook 35 is locked to the seat spring 13 provided in the seat cushion frame 10, and the bottom-surface covering part 31 covers the bottom surface of the seat cushion 2 to be retained in the seat cushion 2.

The lower end portion of the seat back 3 and the bottom surface of the seat cushion 2 are covered with the bottom-surface covering part 31, and the bottom-surface covering part 31 is formed to be integrated with the back-surface covering part 30 as a part of the flexible plate member 22. Thus, the number of components of the seat and the number of manhours can be reduced, and the appearance of the seat can be improved.

In this example, the seat back board 21 further includes the skin material 23 which is joined with the entire surface of the plate member 22 and pocket fabric 24 forming a pocket in the back-surface covering part 30.

The skin material 23 is selected appropriately from leather, woven fabric, nonwoven fabric, and the like. However, preferably, the skin material 23 may be the same material as the skin material used in the cover member 20. Accordingly, the appearance of the seat can be improved further. For example, the skin material 23 adheres to the plate member 22 or is welded to the plate member 22 by melting the resin of the surface of the plate member 22. With the welding, the joining of the plate member 22 and the skin material 23 can be performed together with the thermoforming of the plate member 22. Incidentally, instead of the skin material 23, the surface of the plate member 22 may be subject to surface processing such as emboss processing in order to improve the appearance of the seat.

The pocket fabric 24 may be arranged in the area of the recessed part 33 of the back-surface covering part 30. However, in this example, the recessed part 33 reaches from one edge portion to the other edge portion of the back-surface covering part 30 in the seat width direction over the seat width direction, and the both edge portions of the pocket fabric 24 in the seat width direction are sewn with the sewing part 32 of the back-surface covering part 30 together with the cover member 20. Accordingly, it is possible to perform the sewing of the both edge portions of the pocket fabric 24 and the sewing of the cover member 20 and the sewing part 32 at the same time, and thus the number of manhours can be reduced. The material used in the pocket fabric 24 is not limited particularly. For example, the material may be a skin material such as leather, woven fabric, and nonwoven fabric or may be a material different from the skin material such as net. However, preferably, in order to improve the appearance of the seat, the material is the same skin material as the skin material used in the cover member 20.

In the example illustrated in FIGS. 1 to 3, the locking part for retaining the plate member 22 of the seat back board 21 in the seat cushion 2 is formed of the hook 35 separate from the plate member 22. However, as illustrated in FIGS. 4 and 5, the locking part may be provided to be integrated with the plate member 22.

Figure 4:
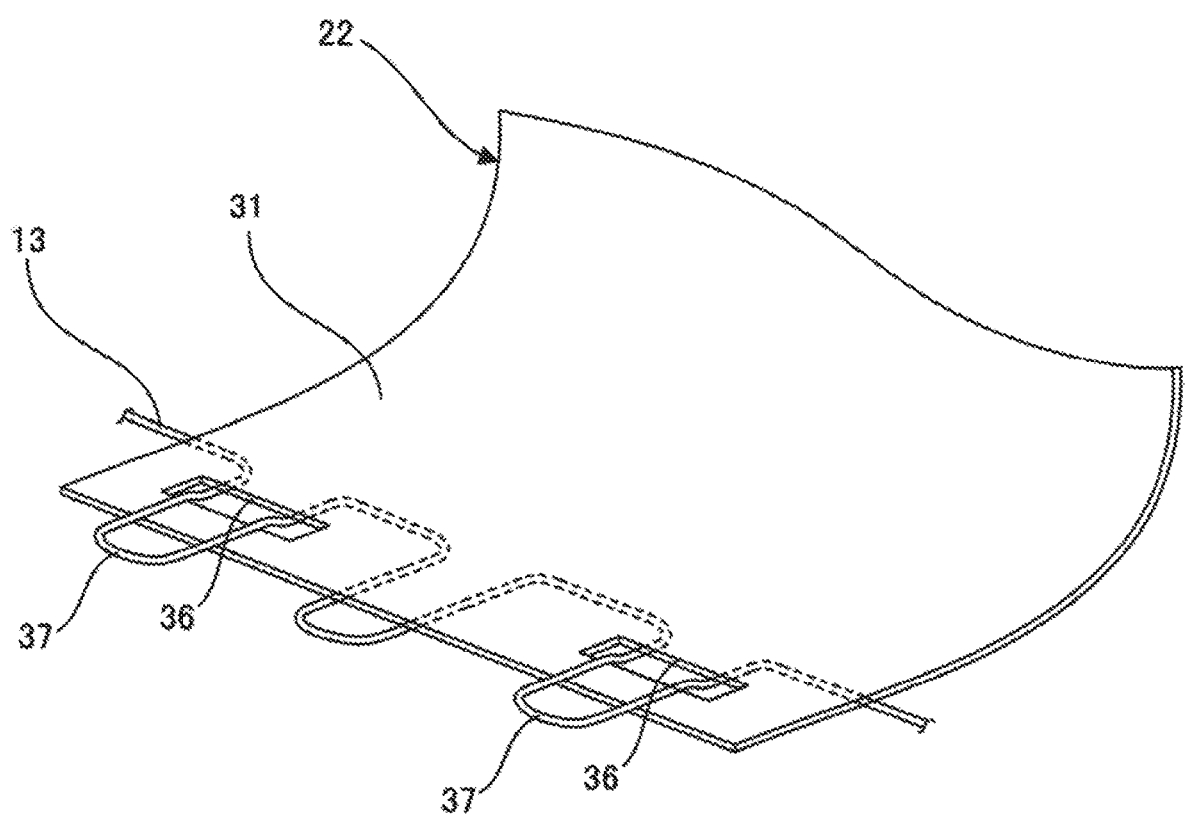
FIG. 4 is a perspective view illustrating a main portion of another example of the seat back board for describing the embodiment of the invention.

In the example illustrated in FIG. 4, the locking part for retaining the plate member 22 in the seat cushion 2 is formed of a slit 36 which is formed in the bottom-surface covering part 31 of the plate member 22. A hook part 37 curved in a substantially U shape is provided in the seat spring 13 provided in the seat cushion frame 10, and the bottom-surface covering part 31 is locked in the seat spring 13 when the hook part 37 is inserted into the slit 36 from the seat rear side toward the front side.

Figure 5:
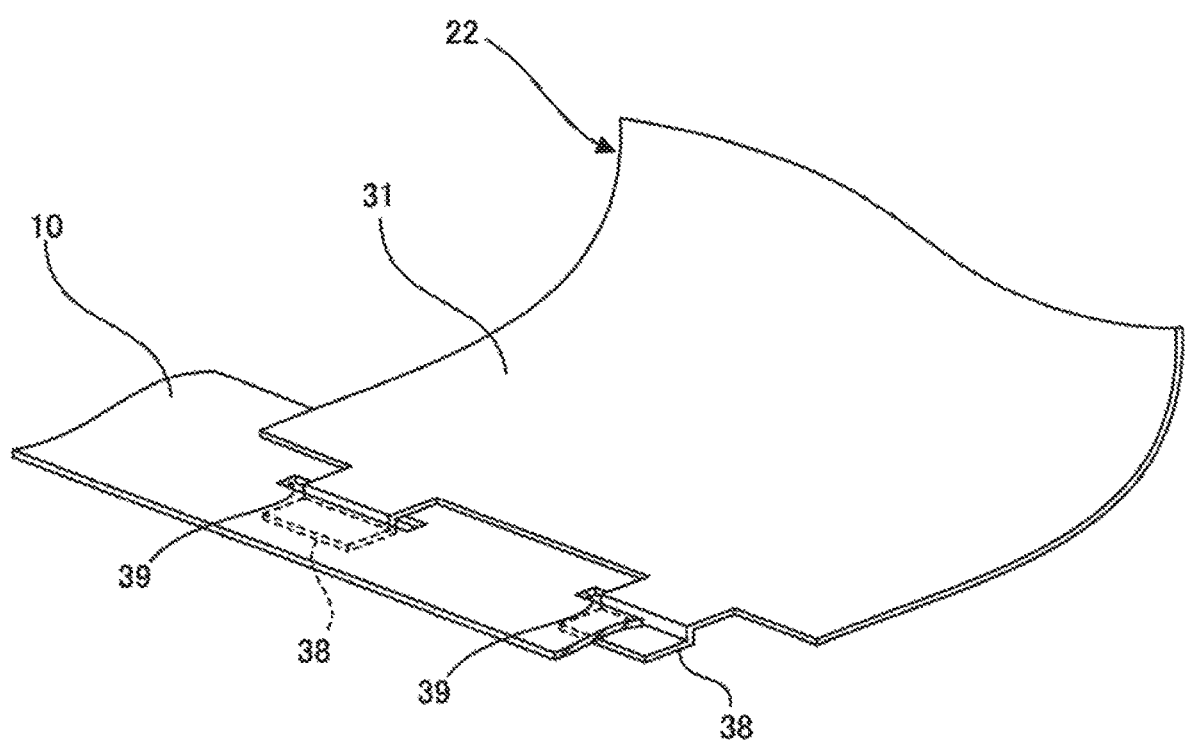
FIG. 5 is a perspective view illustrating a main portion of still another example of the seat back board for describing the embodiment of the invention.

In the example illustrated in FIG. 5, the locking part for retaining the plate member 22 in the seat cushion 2 is formed of a step-shaped hook part 38 which is formed in the end portion of the bottom-surface covering part 31 of the plate member 22. A slit 39 is provided in the seat cushion frame 10, and the bottom-surface covering part 31 is locked in the seat cushion frame 10 when the hook part 38 is inserted into the slit 39.

The Shore hardness of the plate member 22 is higher than 50, and the locking part provided to be integrated with the plate member 22 has a strength sufficient to retain the plate member 22 in the seat cushion 2. Further, the locking part is provided to be integrated with the plate member 22, so that the number of components of the seat and the number of manhours can be reduced.

Hereinbefore, in the description, the sewing part 32 of the plate member 22 is sewn with the cover member 20. However, the sewing part 32 may be sewn with a coupling member such as a slide fastener which is coupled with the cover member 20 in a detachable manner.

The configuration of the seat 1 provided in a vehicle such as an automobile can be applied to a seat of another vehicle such as a ship or an airplane.

Hereinbefore, as described above, the seat back board disclosed in this specification includes: a flexible plate member which is made of a resin material and has the Shore hardness higher than 50, wherein the plate member includes a back-surface covering part which covers a back surface of a seat back and a bottom-surface covering part which covers a bottom surface of a seat cushion, a sewing part is provided which is sewn with a cover member covering a front surface and side surfaces of the seat back or is sewn with a coupling member to be coupled with the cover member in a detachable manner, in an edge portion of the back-surface covering part, and a locking part to be locked in the seat cushion is provided in the bottom-surface covering part.

In the seat back board disclosed in this specification, the Shore hardness of the plate member is equal to or lower than 100.

In the seat back board disclosed in this specification, the locking part is formed to be integrated with the plate member.

In the seat back board disclosed in this specification, the locking part is a hook part to be inserted into a slit provided in the seat cushion.

In the seat back board disclosed in this specification, the locking part is a slit into which a hook part provided in the seat cushion is inserted.

The seat back board disclosed in this specification further includes: a skin material which is joined with a surface of the plate member.

The seat back board disclosed in this specification further includes: pocket fabric which forms a pocket in the back-surface covering part, wherein the pocket fabric reaches from one edge portion to the other edge portion of the back-surface covering part in a seat width direction and is sewn with the sewing part together with the cover member or the coupling member.

The trim cover disclosed in this specification includes: the seat back board; and a cover member which covers a front surface and side surfaces of a seat back, wherein the sewing part provided in the back-surface covering part of the seat back board and the cover member are sewn directly or are coupled through the coupling member sewn with the sewing part.

The vehicle seat disclosed in this specification includes: a seat back which is covered with the trim cover.

What is claimed is:

1. A seat back board comprising:
   a flexible plate member which is made of a resin material and has the Shore hardness higher than 50, the plate member including:
   a back-surface covering part which covers a back surface of a seat back; and
   a bottom-surface covering part which covers a bottom surface of a seat cushion;
   a sewing part, which is sewn with a cover member covering a front surface and side surfaces of the seat back or is sewn with a coupling member to be coupled with the cover member in a detachable manner, being provided in an edge portion of the back-surface covering part; and
   a locking part, to be locked in the seat cushion, being provided in the bottom-surface covering part,
   wherein the locking part is integrally formed with the plate member.

2. The seat back board according to claim 1, wherein the Shore hardness of the plate member is equal to or lower than 100.

3. The seat back board according to claim 1, wherein the locking part is a hook part to be inserted into a slit provided in the seat cushion.

4. The seat back board according to claim 1, wherein the locking part is a slit into which a hook part provided in the seat cushion is inserted.

5. The seat back board according to claim 1, further comprising:
   a skin material which is joined with a surface of the plate member.

6. The seat back board according to claim 1, further comprising:
  pocket fabric which forms a pocket in the back-surface covering part, wherein
  the pocket fabric reaches from one edge portion to the other edge portion of the back-surface covering part in a seat width direction and is sewn with the sewing part together with the cover member or the coupling member.

7. A trim cover comprising:
  the seat back board according to claim 1; and
  a cover member which covers a front surface and side surfaces of a seat back, wherein
  the sewing part provided in the back-surface covering part of the seat back board and the cover member are sewn directly or are coupled through the coupling member sewn with the sewing part.

8. A vehicle seat comprising:
  a seat back which is covered with the trim cover according to claim 7.

\* \* \* \* \*